(12) United States Patent
Wahrenberg

(10) Patent No.: US 11,688,126 B2
(45) Date of Patent: Jun. 27, 2023

(54) IMAGE RENDERING APPARATUS AND METHOD

(71) Applicant: CANON MEDICAL SYSTEMS CORPORATION, Otawara (JP)

(72) Inventor: Magnus Wahrenberg, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 0 days.

(21) Appl. No.: 17/171,059

(22) Filed: Feb. 9, 2021

(65) Prior Publication Data

US 2022/0254094 A1 Aug. 11, 2022

(51) Int. Cl.
*G06T 15/08* (2011.01)
*G06T 7/70* (2017.01)
*G06T 7/00* (2017.01)
*G06T 15/10* (2011.01)

(52) U.S. Cl.
CPC ............ *G06T 15/08* (2013.01); *G06T 7/0012* (2013.01); *G06T 7/70* (2017.01); *G06T 15/10* (2013.01); *G06T 2207/30241* (2013.01)

(58) Field of Classification Search
CPC ........ G06T 15/08; G06T 7/0012; G06T 7/70; G06T 2207/30241; G06T 15/10
See application file for complete search history.

(56) References Cited

U.S. PATENT DOCUMENTS

| 6,100,893 A | 8/2000 | Ensz et al. | |
|---|---|---|---|
| 2004/0063501 A1* | 4/2004 | Shimokawa | A63F 13/10 463/49 |
| 2006/0103650 A1* | 5/2006 | Kamiwada | G06F 3/04815 345/427 |
| 2008/0117205 A1 | 5/2008 | Storti et al. | |
| 2009/0041315 A1 | 2/2009 | Fahmi et al. | |
| 2014/0218360 A1* | 8/2014 | Dalgaard Larsen | G06T 15/20 345/420 |
| 2014/0232634 A1* | 8/2014 | Piemonte | G06F 3/017 345/156 |
| 2015/0208039 A1* | 7/2015 | Kuga | A61B 6/5211 348/46 |

(Continued)

FOREIGN PATENT DOCUMENTS

| EP | 1 074 942 A2 | 2/2001 |
|---|---|---|
| EP | 2 991 033 A1 | 3/2016 |
| WO | WO 2017/104984 A1 | 6/2017 |

OTHER PUBLICATIONS

Ingmar Bitter, et al., "Penalized-Distance Volumetric Skeleton Algorithm," IEEE Transactions on Visualization and Computer Graphics, vol. 7, No. 3, 2001, pp. 195-206.

(Continued)

*Primary Examiner* — Phi Hoang
(74) *Attorney, Agent, or Firm* — Oblon, McClelland, Maier & Neustadt, L.L.P.

(57) ABSTRACT

A medical image processing apparatus comprises processing circuitry configured to:
acquire volumetric image data for rendering;
determine a plurality of positions of a viewpoint or positions of a light based on distance, or other spatial relationship, between the viewpoint or light and a surface or other selected feature in the image data; and
render the volumetric data based on the plurality of viewpoint positions or light positions.

19 Claims, 7 Drawing Sheets

(56) References Cited

U.S. PATENT DOCUMENTS

| | | | |
|---|---|---|---|
| 2016/0080719 A1* | 3/2016 | Tsukagoshi | G06T 11/003 348/46 |
| 2016/0301910 A1* | 10/2016 | Lucas | H04N 13/122 |
| 2017/0169603 A1* | 6/2017 | Chen | H04N 1/00827 |
| 2020/0183181 A1* | 6/2020 | Youngstrom | G06F 3/04815 |
| 2021/0132687 A1* | 5/2021 | Luo | G02B 27/0179 |
| 2021/0375044 A1* | 12/2021 | George | G06T 15/04 |

OTHER PUBLICATIONS

Erik Bylow, et al., "Real-Time Camera Tracking and 3D Reconstruction Using Signed Distance Function," Robotics: Science and Systems, Jun. 2013, 9 pages.

* cited by examiner

IMAGE RENDERING APPARATUS AND METHOD

FIELD

Embodiments described herein relate generally to an apparatus and method for rendering images from volumetric image data.

BACKGROUND

Many known image rendering techniques for providing images of a scene derived from volumetric data enable the position of a viewpoint from whose perspective a scene is rendered to be moved, for example automatically or a command of user. The rendered scene can be updated in real time as the viewpoint moves. Such variation in viewpoint can be particularly useful in medical imaging applications and can enable a user to view an anatomical feature or pathology of interest from different perspectives, for example, to enable a user to view the anatomical feature or pathology of interest from the most clinically useful perspective.

Certain known image rendering techniques also use virtual light sources and render an image of a scene based on the illumination provided by the virtual light source(s). Such techniques can provide movement of the virtual light source, for example automatically or a command of user. The rendered scene can be updated in real time as the virtual light source moves.

In moving viewpoints or virtual light sources, it is known to move the viewpoint or light source with reference to the volume being rendered or a point in the volume. For example, many known systems implement simple orbits of the viewpoint or virtual light source around the center of the volume or the center of a clip box. However, visible material is seldom uniformly distributed around the volume that is being rendered. Therefore, it may seem to a user from viewing the rendered images that the viewpoint, for example a virtual camera, moves towards and away from an object of interest, for example an anatomical feature or pathology of interest, as the viewpoint moves. Even if a clip box is used to define a center of rotation for movement of the viewpoint, similar effects can still occur.

Similar effects to those described in the preceding paragraph can also occur with respect to a virtual light source. As the light source moves around the volume, the distance between the light source and the visible material changes, unless the visible material is uniformly distributed around the center of rotation which is generally not the case. For the point lights or other lights that have an associated fall-off of illumination intensity with distance, this can result in a significant change in brightness of the rendered image as the light source moves.

BRIEF DESCRIPTION OF THE DRAWINGS

Embodiments are now described, by way of non-limiting example, and are illustrated in the following figures, in which.

DETAILED DESCRIPTION

Certain embodiments provide a medical image processing apparatus, comprising processing circuitry configured to:
 acquire volumetric image data for rendering;
 determine a plurality of positions of a viewpoint or positions of a light based on distance, or other spatial relationship, between the viewpoint or light and a surface or other selected feature in the image data; and
 render the volumetric data based on the plurality of viewpoint positions or light positions.

Certain embodiments provide a method comprising receiving volumetric image data for rendering, determining a plurality of positions of a viewpoint or positions of a light based on distance, or other spatial relationship, between the viewpoint or light and a surface or other selected feature in the image data, and rendering the volumetric data based on the plurality of viewpoint positions or light positions.

Figure 1:
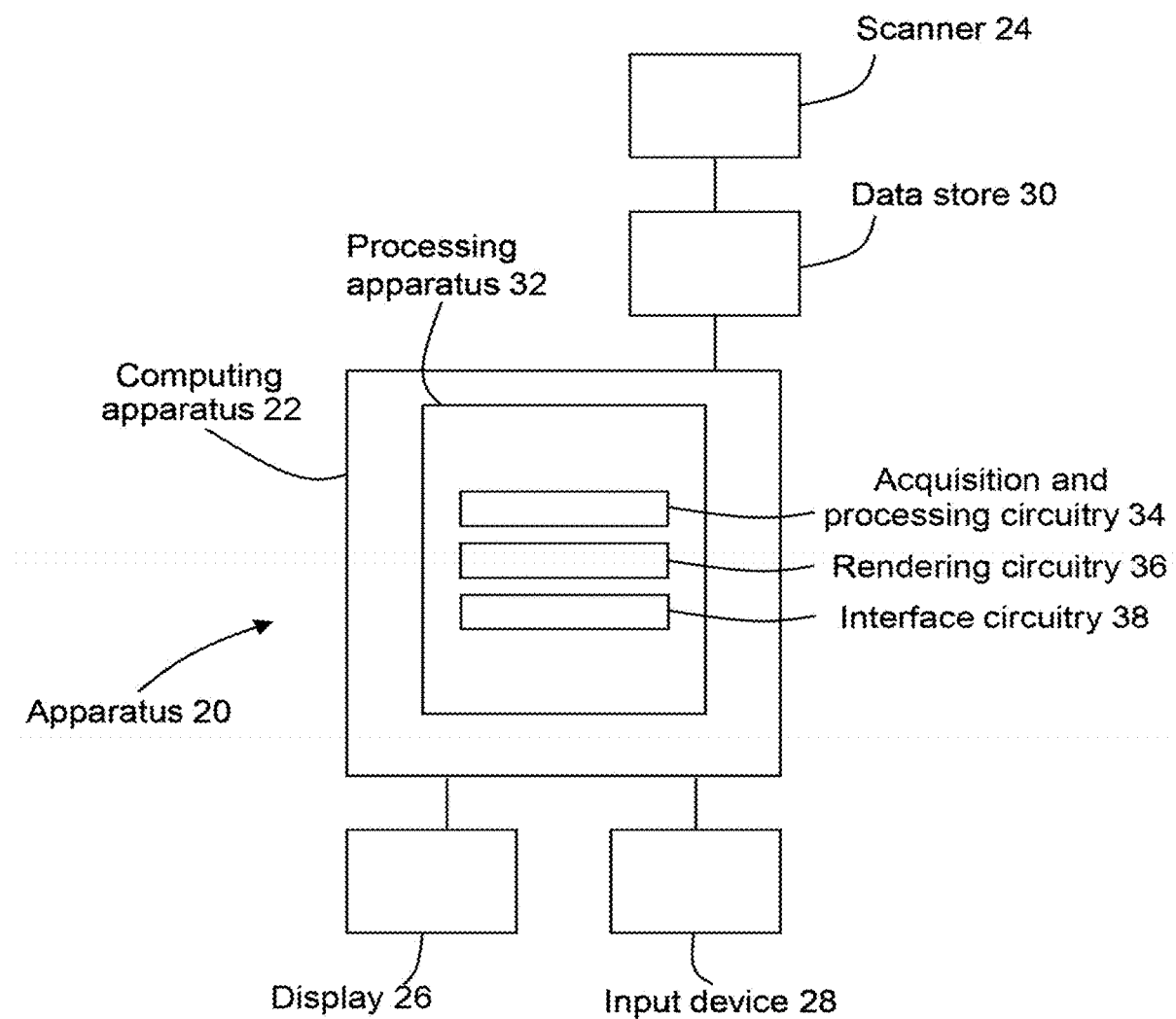
FIG. 1 is a schematic illustration of an apparatus according to an embodiment.

A data processing apparatus 20 according to an embodiment is illustrated schematically in FIG. 1. In the present embodiment, the data processing apparatus 20 is configured to process medical imaging data. In other embodiments, the data processing apparatus 20 may be configured to process any other suitable image data.

The data processing apparatus 20 comprises a computing apparatus 22, which in this case is a personal computer (PC) or workstation. The computing apparatus 22 is connected to a display screen 26 or other display device, and an input device or devices 28, such as a computer keyboard and mouse.

The computing apparatus 22 is configured to obtain image data sets from a data store 30. The image data sets have been generated by processing data acquired by a scanner 24 and stored in the data store 30.

The scanner 24 is configured to generate medical imaging data, which may comprise two-, three- or four-dimensional data in any imaging modality. For example, the scanner 24 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner. The medical imaging data may comprise or be associated with additional conditioning data, which may for example comprise non-imaging data.

The computing apparatus 22 may receive medical image data and/or the further conditioning data from one or more further data stores (not shown) instead of or in addition to data store 30. For example, the computing apparatus 22 may receive medical image data from one or more remote data stores (not shown) which may form part of a Picture Archiving and Communication System (PACS) or other information system. Computing apparatus 22 provides a processing resource for automatically or semi-automatically processing image data. Computing apparatus 22 comprises a processing apparatus 32.

The processing apparatus 32 includes acquisition and processing circuitry 34 that is configured to acquire image data representative of a volume of interest, either from the scanner 24, the data store 30, the further data stores, or any other suitable source. The acquisition and processing circuitry 34 is also configured to perform image data processing in respect of the acquired data, for example to identify surfaces of other features represented by the data. For example, the acquisition and processing circuitry 34 can use any suitable known segmentation techniques to identify surfaces or other features of interest represented by the data, for example surfaces and/or anatomical features of interest and/or pathologies of a patient or other subject represented by the data.

The processing apparatus 32 also includes rendering circuitry 36 that is configured to render images based from the acquired image data. The rendering circuitry 36 can use any suitable image rendering techniques and can render the image based on a selected viewpoint, which may for example comprise a virtual camera, from the perspective of which the rendering is performed. The rendering circuitry 36 may generate one or more simulated light sources, either automatically or on command of a user, and the rendering may be performed based on simulated illumination provided by the light source(s).

The processing circuitry also comprises interface circuitry 38 that is configured to obtain user or other inputs and/or to output rendered image frames or other rendered data from the rendering circuitry, for example to the display screen 26 for display. In some embodiments, the interface circuitry is configured to obtain user input that is used to determine the viewpoint position and/or the position of the virtual light source(s) and the variation of those positions.

In the present embodiment, the circuitries 34, 36, 38 are each implemented in computing apparatus 22 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 22 also includes a hard drive and other components of a PC including RAM, ROM, a data bus, an operating system including various device drivers, and hardware devices including a graphics card. Such components are not shown in FIG. 1 for clarity.

The data processing apparatus 20 of FIG. 1 is configured to perform methods as illustrated and/or described in the following.

It is a feature of certain embodiments that the rendering circuitry is configured to determine a plurality of positions of the viewpoint and/or positions of the virtual light source(s) based on distance between the viewpoint or light source(s) and a surface or other selected feature in the image data, and to render the volumetric data to obtain images based on the plurality of viewpoint positions or light positions.

Figure 2:
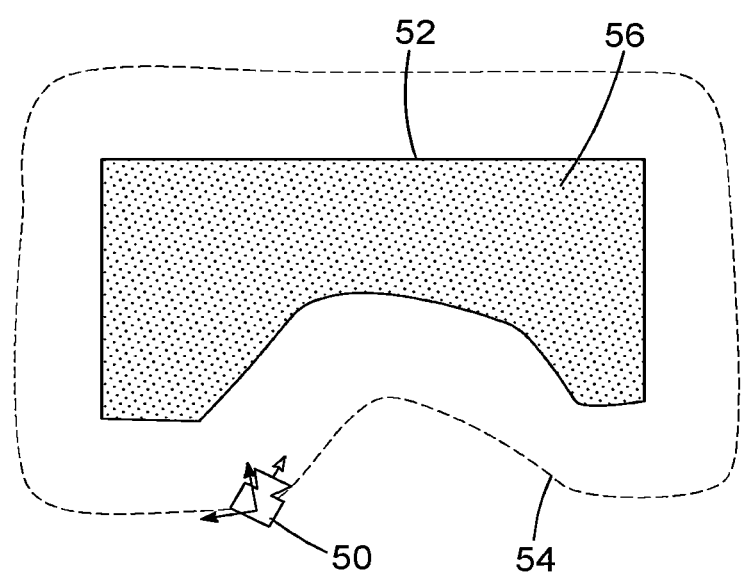
FIG. 2 is a schematic illustration showing a path of a viewpoint relative to a surface of an object of interest in an imaging volume, provided in an embodiment.

FIG. 2 is schematic illustration showing a path 54 of a viewpoint 50 relative to a surface 52 of an object of interest 56 in an imaging volume, according to an embodiment.

The acquisition and processing circuitry 34 receives the volumetric imaging data, in this embodiment CT data from data store 30, and then performs a segmentation process to identify features of interest, for example anatomical features or pathologies of interest, and to determine the boundaries of such features, which can be considered to represent the position of the surfaces of the features of interest. Any suitable segmentation technique can be used by the acquisition and processing circuitry, for example based on intensity values of an array of voxels forming the volumetric imaging data in some embodiments. In the example of FIG. 2, the acquisition and processing circuitry 34 determines the position of the surface 52 of the object of interest 56, for example using a thresholding process in respect of intensity values of voxels to identify those voxels that represent the object of interest 56, and then determining from the identified voxels the position of the surface 52 of the object 56.

The imaging data is also provided by the acquisition and processing circuitry 34 to the rendering circuitry 36, which performs a rendering process to generate one or more images representing the volume, and in particular the object of interest 56 or part of the object. The rendering process is performed from the perspective of the viewpoint 50. Any suitable rendering technique for producing an image representing a view of a scene represented by volumetric data may be used. For example, global illumination techniques, or other advanced image rendering techniques, based on casting rays from virtual light source(s) into the volume, calculating a resulting volumetric array of irradiance values representing irradiance at an array of points in the volume, and determining an image from the light received at the viewpoint based on the irradiance as a function of position and the passage of light from points in the volume to the viewpoint. However, embodiments are not limited to such techniques and any suitable rendering techniques may be used.

The position of the viewpoint 50 may be set by a user or may be set automatically. The viewpoint 50 may be moved and further images may be rendered for the resulting different viewpoint positions. Movement of the viewpoint 50 may be initiated on command of a user, or automatically, and it is a feature of the embodiment that the viewpoint is, in response, moved along a path 54.

The positions of the viewpoint 50 along the path 54 are determined by the rendering circuitry 36 and the rendering circuitry renders an image of the volume from the perspective of the viewpoint for each of the positions along the path 54. Thus, in this example, the user would see a succession of images of the object of interest as the viewpoint 50 orbits around the path 54, enabling the user to view the object from a succession of different perspectives.

It is a feature of the embodiment that the position of the viewpoints along the path 54 are determined by the rendering circuitry 36 based on distance between the viewpoint 50 and the surface 52 of the object of interest as determined by the acquisition and processing circuitry. In the example of FIG. 2, the rendering circuitry determines the path 54 and positions of the viewpoint so as to maintain a constant distance between the viewpoint 50 and the surface 52 as the viewpoint moves around the object 56.

Any suitable techniques can be used for calculating the desired position of the viewpoint, but in the embodiment of FIG. 1 the acquisition and processing circuitry 34 uses a signed distance field (SDF) to represent the visible material surface 52.

The rendering circuitry 36 then selects position of the viewpoint 50, for example position of a virtual camera, and determines movement of the viewpoint 50 so that it traverses the SDF field such that the distance to the surface remains constant (or so that any other desired requirement or constraint governing movement of the viewpoint is satisfied).

The maintenance of the viewpoint at a fixed distance from the surface or other desired feature can provide an impression of greater realism or clarity to the user and can, for example, enable the user to examine the surface or other feature or interest without distracting or other undesirable effects arising from the viewpoint moving towards or away from the surface or feature of interest as the viewpoint moves.

In the present embodiment, signed distance field (SDF) is used to represent a scalar volume where each pixel or voxel takes on the value of the Euclidian distance to the nearest surface or surfaces, or to other selected feature or surface. Voxels, or other data points, that represent positions on the inside of an object have a negative distance, and thus the SDF value for such voxels, or other data points, are given a negative value of the SDF. Voxels, or other data points, that represent positions on the inside of an object have a positive distance, and thus the SDF value for such voxels, or other data points, are given a positive value of the SDF.

The SDF representation of a surface geometry has fixed complexity random access, and surface characteristics, for example spatial variation of the surface or distance from any point in the space to the surface, can be determined by reading and processing SDF values, for example at any point in O(1).

Other methods can be used to model the surface, and thus to determine distance to the surface from points in the volume, in alternative embodiments, for example meshes or space partitioned meshes, but they can require more complex calculations.

In the embodiment of FIG. 1, after performing the segmentation process to determine surfaces or other features of interest represented by the volumetric data, the data acquisition and processing circuitry 34 then calculates SDF values for the volume, for example for each voxel in the volumetric data set. The SDF values in the example of FIG. 2 represent the distance of each voxel to the surface 52.

The calculated SDF values are then stored, for example in a look-up table and/or in a database. The rendering circuitry can then look up values of the SDF for any particular position or positions in the volume and can use the values of the SDF to determine positions of the viewpoint 50, for example to maintain the viewpoint at constant distance from the surface 52 or to satisfy any other desired rules or constraints. Values of the SDF can be interpolated or extrapolated or re-calculated if necessary, to obtain SDF values for particular positions, for example if the position of the viewpoint or light source is determined with a higher or lower resolution that the spatial resolution of the stored SDF values, or if the position of the viewpoint or light source is outside a region for which stored SDF values are available.

In the embodiment of FIG. 1, the position of the viewpoint, for example position of a virtual camera, defines a coordinate frame where instructions to move the viewpoint in a particular direction, for example left, right, up or down, can be implemented by movement along tangent vectors of the field of SDF values as a function of position, and instructions to move the viewpoint inwards or outwards relative to the surface or other feature of interest can be implemented by movement would be in the gradient direction of the SDF field. Thus, movements based on separate translation and rotation calculations for each movement of the viewpoint can be replaced with a single interactive model based on SDF values. Any other operations based on SDF values can be performed if necessary to determine movement of the viewpoint.

Use of the SDF field, for example a look-up table including pre-calculated SDF values, can provide a particularly simple way of determining how to move the viewpoint, either automatically or in response to user input, in order to move the viewpoint while maintaining a fixed distance from, or any other desired spatial relationship with, the surface or other feature of interest.

It is a feature of variants of the embodiment of FIG. 1 that as well as the position of the viewpoint, a view direction of the viewpoint, for example an orientation of a virtual camera, can also be determined based on spatial relationship to a surface or other selected feature of interest. A process according to such variants is illustrated in overview in the flowchart of FIG. 3.

At a first stage 60 of the process, a desired movement of the viewpoint 50 is determined, either automatically or on command of a user. For example, as discussed, the desired movement may be such as to maintain a constant distance between the viewpoint 50 and the nearest point on the surface 52 (with the nearest point changing as the viewpoint 50 moves).

The position and extent of the object of interest 56 and the surface 52 are determined using a segmentation process as described above in relation to FIGS. 1 and 2. Values of the SDF are calculated for positions across the volume based on the determined position of the surface 52, and the calculated values of the SDF are stored in a lookup table together with corresponding positions in the volume, again as described above in relation to FIGS. 1 and 2.

At the next stage 62 of the process, the rendering circuitry 36 uses the current session of the viewpoint 50 (or other selected starting position of the viewpoint 50), the selected requirement that the viewpoint 50 maintains a constant distance to the surface 52, and the SDF lookup table to determine a series of points that satisfy the requirement. In the current example, the circuitry 36 uses the lookup table to determine positions in the volume that represent a contour line with constant distance to the surface 52, starting from the current viewpoint position.

As the next stage 64, the rendering circuitry 36 determines the movement of the viewpoint 50 by determining the succession of positions that the viewpoint 50 will take and the time at which the viewpoint moves to the next position. The determined succession of points makes up the path 54. In some embodiments the succession of positions are positions that are read from the lookup table and that correspond to the SDF values that comply with the selected requirement (e.g. a requirement of constant distance to the surface, or any other selected requirement). In other embodiments, the succession of positions may be determined using interpolation, extrapolation or other calculation based on positions and SDF values that are read from the lookup table.

The time at which the viewpoint 50 moves to the next position along the path 54 can be determined, for example, using a value of speed or velocity parameter which may be set based on user input, may be determined automatically, and/or may be predetermined. In various embodiments, the speed or velocity parameter may represent speed of movement of the viewpoint in a linear direction, for example in linear direction in a Cartesian co-ordinate system of the volume represented by the imaging direction. In other embodiments, or modes of operation, the speed or velocity parameter represents angular velocity.

Returning to the flowchart, at the next stage 66, a desired requirement for the view direction of the viewpoint 50, for example orientation of a virtual camera, is determined, either automatically or on command of a user.

In the present embodiment, the desired requirement is that the viewpoint 50 points towards a nearest point on the surface 52 of the object 56. Thus, the view direction of the viewpoint 50 will change as the viewpoint 50 moves along the path 54 around the object 56, to ensure that the viewpoint 50 continues to point towards a nearest point on the surface 52 throughout the movement.

In alternative embodiments, any other desired requirement for the direction of view of the viewpoint 50 may be selected or pre-determined. For example, in some embodiments there may be an additional requirement that the direction of view is varied depending on the angle it makes with the surface, for example to look straight on to or at a selected or a desired oblique angle to the surface. Such embodiments may be relevant to viewing of curved structures, for example if the virtual camera is positioned within a tubular or other curved structure.

At the next stage 68, the rendering circuitry 36 uses the succession of positions of the viewpoint 50 determined at stage 64, the selected requirement that the view direction of the viewpoint 50 is such that the viewpoint points towards a nearest point on the surface 52, and the SDF lookup table to determine SDG values for use in calculation of the required view direction of the viewpoint at each of the determined positions of the viewpoint 50 along the path 54.

At the next stage 69, the rendering circuitry 36 uses the SDF values to determine a required view direction for each of the positions of the viewpoint 50 along the path 54. For the requirement that the viewpoint points towards a nearest point on the surface, the view direction corresponds to a direction along a gradient line of a field of the SDF values and so the rendering circuitry 36 can determine the view direction for each of the positions of the viewpoint 50 along the path 54 by performing a gradient calculation based on SDF values for the position of the viewpoint and surrounding values. In some embodiments, SDF gradient values are pre-calculated and the look-up table also stores SDF gradient values together with SDF values.

Following stage 69, the rendering circuitry then performs a performs a rendering process to generate a succession of images from the perspective of the viewpoint 50 for each of the determined positions of the viewpoint 50 and the associated determined view directions.

The generated images may be stored and/or displayed. The images may for example be displayed as an animation and/or as a succession of still images. In the case of an animation, the change in the images as the animation progresses may correspond to the value of the speed or velocity parameter mentioned above. In some embodiments the speed or velocity may be set by the user and the animation may be speeded up or slowed down on command of the user. Additionally, or alternatively a succession of the still images may be displayed in sequence in a step-through process, and stepping from one image to the next may be performed either automatically or on command of a user.

As mentioned above, in some embodiments, depending on the rendering process used, the rendering circuitry 36 may generate one or more simulated light sources, either automatically or on command of a user, and the rendering of a images may be performed based on simulated illumination provided by the light source(s).

It is a feature of some embodiments that the position of a virtual light source can also be determined based on distance between the light source and a surface 52 or other selected feature in the image data.

In some such embodiments, the position of the virtual light source may be varied depending at least in part on the position of a viewpoint 50 from whose perspective an image rendering process is performed. For example, whilst a virtual light source may be at any desired position, if the viewpoint 50 is on one side of an object to be viewed then the virtual light source would usually at least be positioned on the same side of the object as the viewpoint such that the surface to be viewed is illuminated.

If there is relative movement between a viewpoint 50 and an object 56 to be viewed, for example if the viewpoint 50 is moved around the object 56, then usually the virtual light source will also be moved to ensure that the surface of the object that is being viewed remains adequately illuminated.

Figure 3:
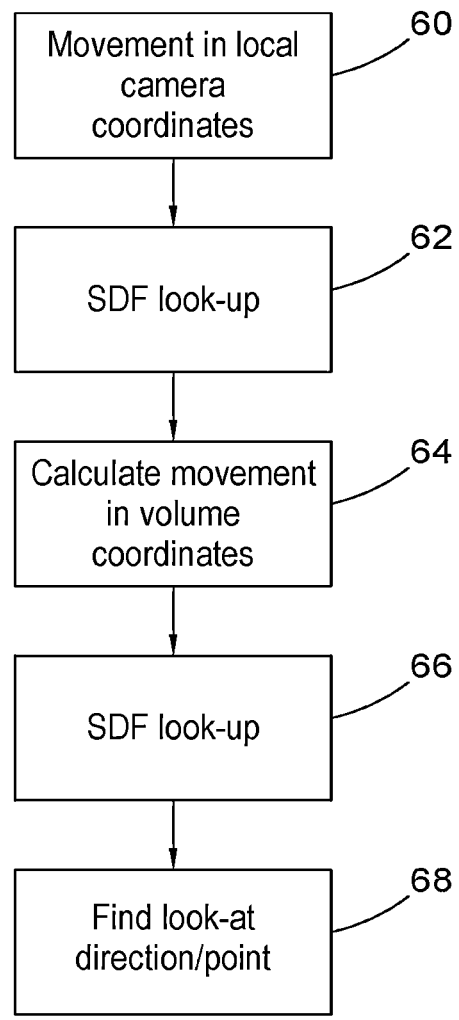
FIG. 3 is a flowchart illustrating in overview a method according to an embodiment.

According to embodiments, the same or similar processes that are performed to determine positions of the viewpoint 50 relative to a surface or other feature of interest according to the embodiments of FIGS. 1 to 3 are used to determine positions and/or orientation of a virtual light source relative to the surface or other feature of interest.

Figure 4:
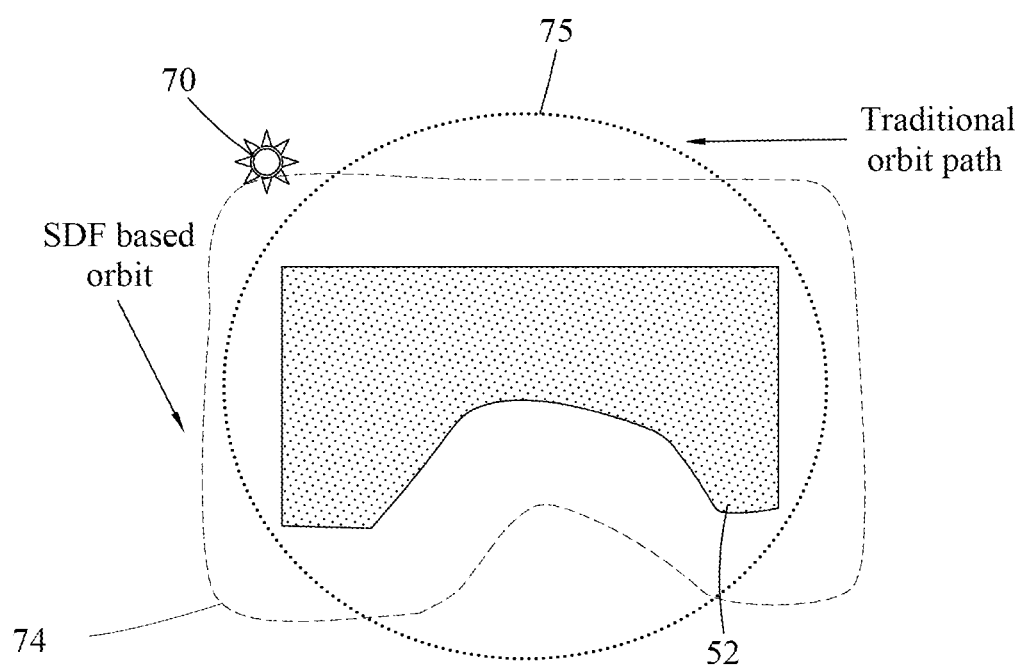
FIG. 4 is a schematic illustration showing a path of a virtual light source relative to a surface of an object of interest in an imaging volume, provided in an embodiment.

For example, in one embodiment illustrated in FIG. 4, the system of FIG. 1 is used to determine the position of a virtual light source 70 as it moves around the object 56. The virtual light source 70 in this embodiment is determined to have a succession of positions such that the virtual light source 70 follows path 74 around the object 56.

The path 74 is such that the virtual light source 70 maintains a constant distance from the nearest point on the surface 52 of the object 56. The positions of the virtual light source 70 are calculated using SDF values in the same manner as described above, for calculating positions of the viewpoint 50, in relation to FIGS. 1 to 3.

FIG. 4 also shows a path 75 that would be followed if the virtual light source 70 were to follow a circular path around a fixed point in the volume. It can be understood from FIG. 4 that if the virtual light source were to follow such a fixed path then the surface 52 of the object 56 would appear alternately lighter and darker as the virtual light source 7 came closer to and further away from the surface 52. In contrast, by ensuring that the virtual light source follows path 74 according to which the virtual light source 70 maintains a constant distance from the surface then the level of illumination of the surface can be maintained constant, or be normalized, or at least be more even, as the virtual light source moves relative to the object 56.

In embodiments where the light source has a directionality, rather than having omnidirectional intensity with no variation of intensity with angle, then the orientation of the light source may be calculated, for example using SDF values, in the same or similar manner as described above, for calculating view direction of the viewpoint 50, in relation to FIGS. 1 to 3. For example, in some embodiments the light source may be controlled to point towards the nearest surface or other feature of interest. Alternatively, or additionally, in some embodiments there may be an additional requirement that the orientation of the light source is varied depending on the angle it makes with the surface, for example to direct a light beam and/or light of maximum intensity straight on to or at a selected or a desired oblique angle to the surface or other feature.

In further embodiments, each of the processes for calculating positions of the viewpoint 50 described above are, additionally or alternatively, used to calculate the position of the virtual light source 70.

In some embodiments, both the virtual light source 70 and the viewpoint 50 are moved relative to the object to maintain a respective desired position relative to the surface 52 or other feature of interest. For example, in some embodiments both the virtual light source 70 and the viewpoint 50 are moved along respective paths so as to maintain respective fixed distances from the surface 52 or other feature of interest.

In some such embodiments, the virtual light source is further away than the viewpoint from the surface or other feature of interest and/or movement of the virtual light source along its respective path may lag behind, or be in advance of, the position of the viewpoint along its respective path. For example, in some such embodiments motion is speeded up/slowed down so that an orbit period is constant. In such a configuration two independent orbits for the light and camera may, for example, be synchronized.

In some embodiments, the calculations of the position of the virtual light source and the position of the viewpoint may be performed separately, for example using SDF values as described. In other embodiments, the position of the virtual light source may be determined relative to that of the viewpoint, or vice versa. For example, the positions of a viewpoint, for example the path 54, may be determined using SDF values as described above in relation to FIGS. 1 to 3, and the position of the virtual light source may be determined relative to that of the viewpoint. For instance, the virtual light source may be determined to be at a selected or predetermined distance and/or angle relative to the position of the viewpoint. Thus, as the viewpoint moves around the object along path 54 the virtual light source will also move around the object. Further constraints could be applied, for example the virtual light source could be determined to be at a fixed distance from the viewpoint but always further away from the surface of the viewpoint. In that example, the fixed distance of the virtual light source from the viewpoint may, for example, be a fixed distance in a direction perpendicular to, or at another selected angle relative to, a contour line representing constant SDF value.

Depending on the shape of an object that is being viewed, and the arrangement of the surface of the object, the succession of determined positions of the viewpoint (or virtual light source) may follow a path that extends in all three orthogonal directions in a Cartesian coordinate system of the volume e.g. the positions may follow a 3D path. For example, as well as being on an x-y plane (or other plane) the path may also extend in the z direction (or other direction). In some embodiments, the rendering circuitry constrains the viewpoint or light to be on a selected two-dimensional plane in the volume. In some such embodiments, the rendering circuitry is configured to determine the viewpoint positions or light positions on the plane based on a projection onto the plane of a constant gradient line of an SDF or other determined path. For example, as the SDF traversal can take the camera in a 3D path, a mode can also be defined where the SDF is defined for each movement axis as a fixed plane in which the movement does not stray off that plane.

Figure 5:
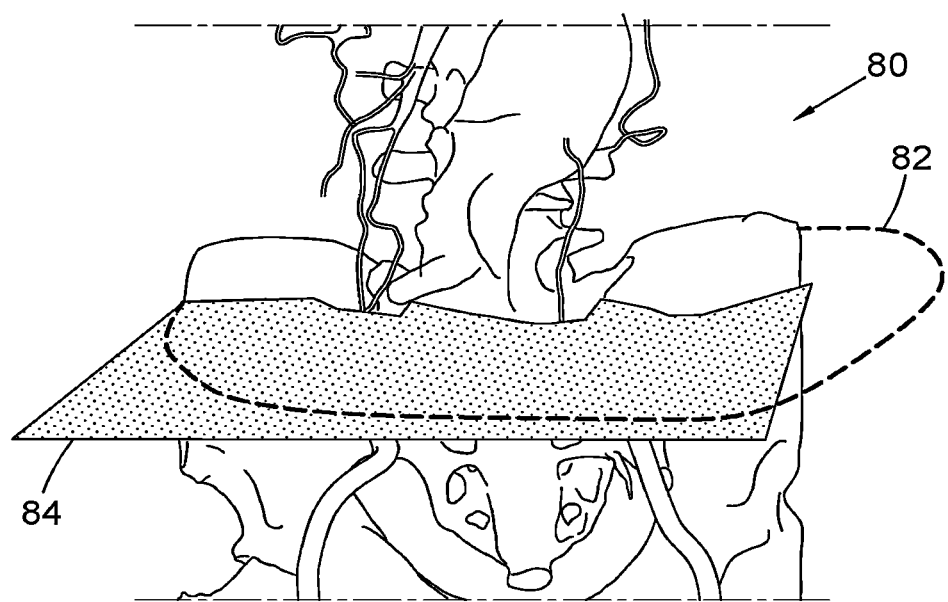
FIG. 5 is a schematic illustration showing a path of a viewpoint, projected onto a plane, relative to a surface of an object of interest in an imaging volume.

An example of an embodiment in which the viewpoint, or virtual light source, is constrained to be on a selected two-dimensional plane is illustrated in FIG. 5. In this example, the object of interest is the pelvis and spine region of a human subject and the path of the viewpoint that is calculated in order to maintain a constant distance to closest point on surface follows a path in three dimensions. The path is projected onto a selected two-dimensional plane 84 and the viewpoint is constrained to follow path 82 that corresponds to the projection onto the plane 84.

In some embodiments, an object of interest may have a relatively complex structure and a path of the viewpoint and/or virtual light source, is determined based on distance to a surface or other feature of interest of the object, may correspondingly be relatively convoluted with, for example, numerous turning points or rapid changes in direction. In some embodiments, a smoothing process is performed to smooth the calculated path of the viewpoint and/or virtual light source. For example, in some embodiments, an averaging window of selected or predetermined width may be used to average calculated location values thereby to smooth the calculated path of the viewpoint and/or virtual light source. Any other suitable smoothing process may be used in alternative embodiments. As discussed above in relation to FIG. 3, a view direction of the viewpoint, for example an orientation of a virtual camera, can also be determined based on distance to a surface or other selected feature of interest. In the embodiment described in relation to FIG. 3, the selected requirement for the view direction of the viewpoint 50 is that the view direction is such that the viewpoint points towards a nearest point on the surface 52.

Any other suitable requirements or constraints for the view direction of the viewpoint can be provided in alternative embodiments. The view direction in some embodiments can be calculated based upon, for example, contour or gradient lines in the SDF field, and/o based upon local or global minima of the SDF field, or other functions of the SDF field. The SDF field represents the calculated SDF values as a function of position in the volume represented by the imaging data.

Figure 6:
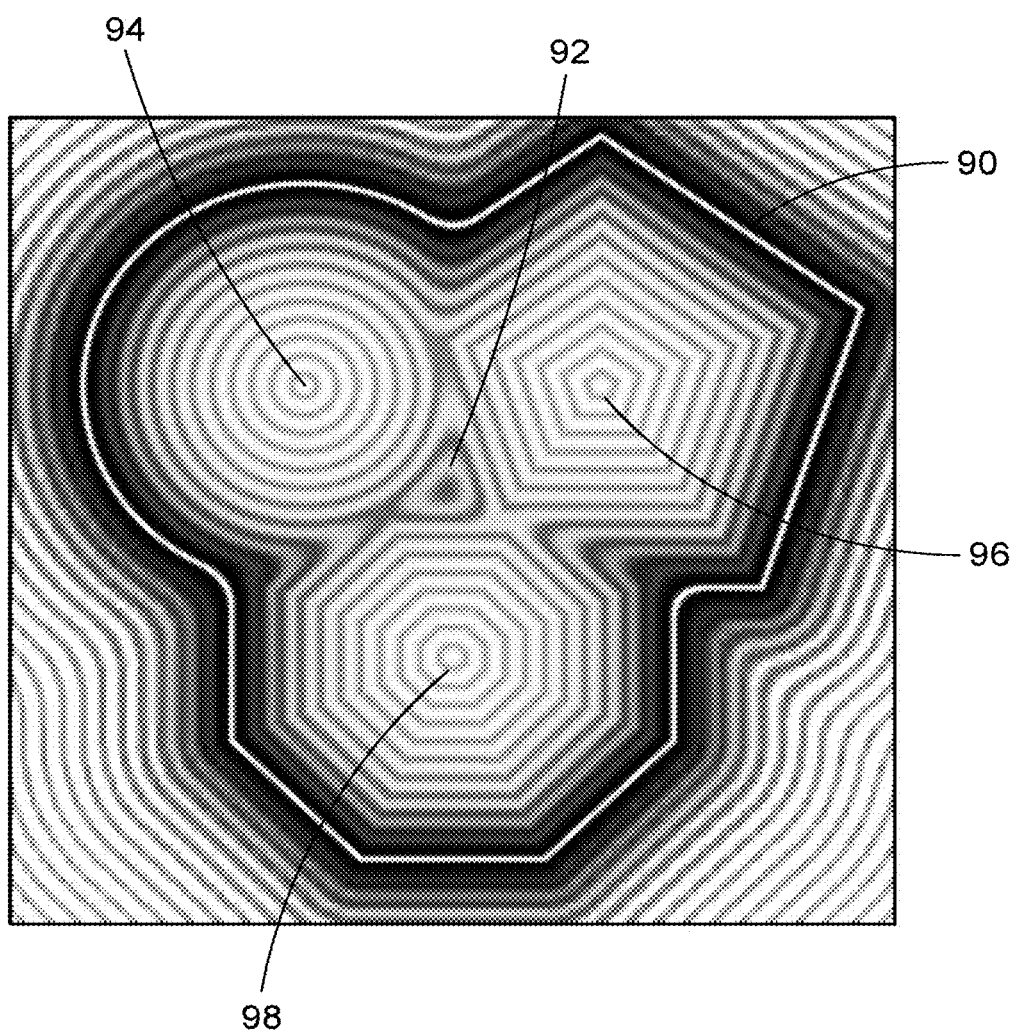
FIG. 6 is a schematic illustration of an object in an imaging volume with contour lines indicating constant values of SDF.

FIG. 6 is a schematic illustration showing an object of interest having a surface 90. The lines included in FIG. 6 are contour lines, each representing a respective constant value of SDF. The SDF at positions outside the surface 90 has positive values and the SDF at positions inside the surface 90 has negative values. The SDF in this example has local minima at positions 94, 96 and 98, and a global minimum at position 92.

The view direction some embodiments is defined as being along a gradient (e.g. the steepest gradient at the position in question) of the SDF, which means that the view direction is towards the nearest object.

In other embodiments, the view direction is selected as being towards a global minimum of the SDF (for example towards point 92) which may for example represent the center of the object or the largest or most solid object.

In some embodiments view direction selected as being towards the closest local minimum of the SDF (for example, 94, 96 or 98). This can be more stable than looking along a gradient line of the SDF, as the direction of the gradient line may change rapidly as the viewpoint moves, depending on the complexity of the object surface.

In embodiments where the view direction is determined as being towards local SDF minima, the view direction can change instantaneously as the viewpoint moves, for example in the embodiment of FIG. 6 if the closest local minimum to the viewpoint 50 switches from being one of 94, 96, 98 to another of 94, 96, 98. In some such embodiments, an additional constraint is applied such that a maximum rate of change of the view direction is provided. In such embodiments, the view direction will then change gradually, at the selected or predetermined maximum rate, even when there is a sudden switch from one local minimum of the SDF to another local minimum of the SDF.

In various embodiments, the view direction and/or orientation of a virtual light source is independent of a movement direction of the viewpoint or light. The view direction or light orientation may be determined based on a direction of movement of the viewpoint or light. The view direction or light orientation may be along a gradient, for example a steepest gradient of the SDF. The view direction or light orientation may be towards the nearest surface or other selected feature, and/or towards a selected point. In some embodiments, the view direction or light orientation may be towards a global minimum point or local minimum point of an SDF.

As discussed above, in relation to FIG. 3, the speed or velocity of movement of the viewpoint, and/or of the virtual light source, can be controlled or varied as desired. In some embodiments the speed of movement of the viewpoint and/or the virtual light source is varied depending on the shape of the path followed in the Cartesian co-ordinate system so as to maintain a constant or near-constant angular velocity.

Figure 7:
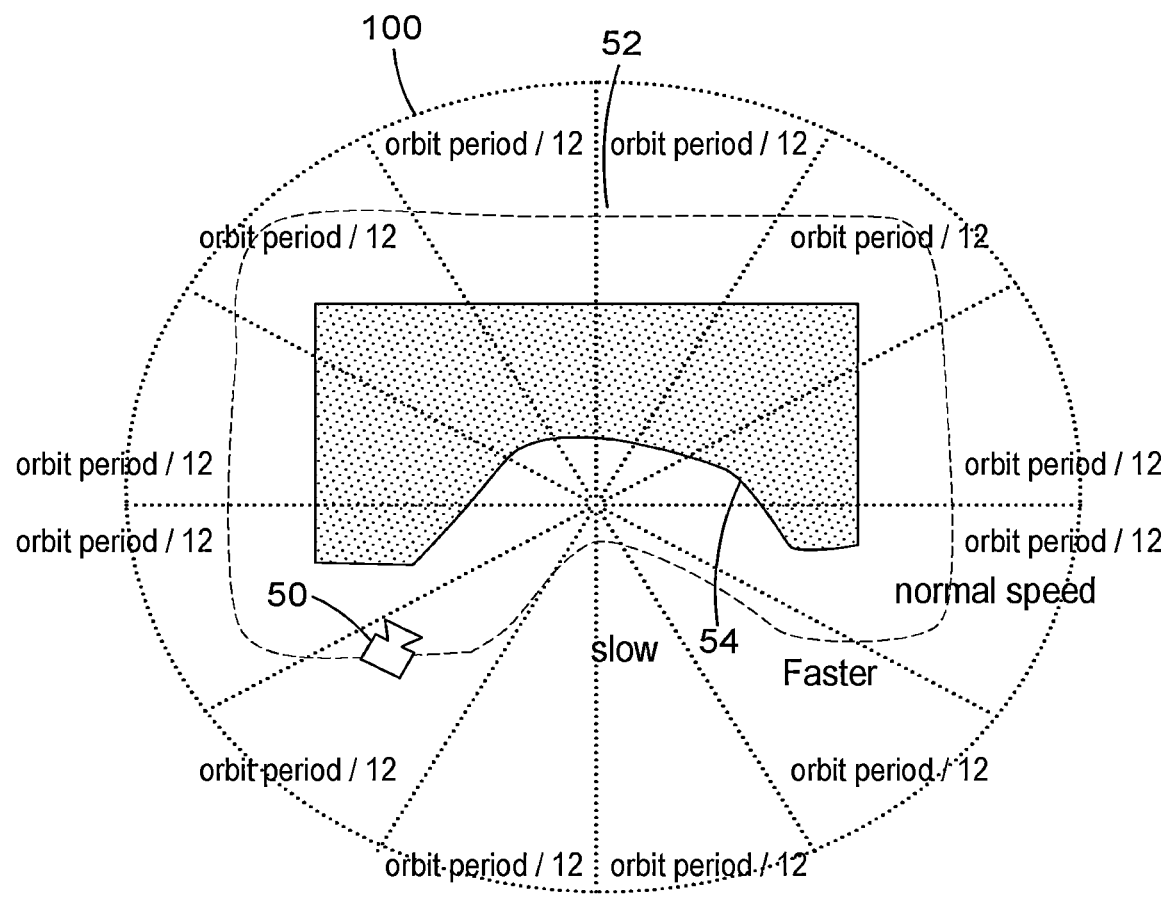
FIG. 7 is a schematic illustration showing a path of a viewpoint relative to a surface of an object of interest in an imaging volume, provided in an embodiment and indicating variation of speed of movement of the viewpoint for different angular segments.

One such embodiment is illustrated in FIG. 7, in which the rendering circuitry 36 divides the path followed by the viewpoint 50 into 12 equally-sized angular segments of a circle 100 defined with respect to a fixed point 102. The speed of movement of the viewpoint along the path is varied such that, for each segment, the time taken for the viewpoint to traverse the segment is substantially the same as for each other segment. Thus, for example, in the embodiment of FIG. 7, the viewpoint 50 moves slower when passing through segment 104a, faster when passing through segment 104b and at an intermediate, or normal, speed when passing through segment 104c to ensure that the angular velocity achieved by the viewpoint 50 when passing through each of the segments is substantially the same.

Any other desired control of angular velocity or speed of the viewpoint and/or the virtual light source may be provided in other embodiments. For example, a speed of movement of the viewpoint or light may be varied in dependence on distance to a surface or other selected feature, in any desired manner.

Embodiments have been described in which a viewpoint and/or virtual light source is moved in such a way as to satisfy a selected requirement, for example such the viewpoint and/or virtual light source maintains a constant distance from a surface or other feature of an object of interest. The movement may be continuous or step-wise and may be performed automatically or on command of a user. Additional or alternative constraints are applied to movement of the viewpoint and/or virtual light source in alternative embodiments.

For example, constraints can be applied to avoid penetration into or through the surface or other selected feature of the viewpoint and/or light source, even if commanded by a user, and/or to maintain a desired minimum distance of the viewpoint and/or light source from the surface or other feature even if a user commands the viewpoint and/or light source to move closer than the minimum distance.

In some embodiments, the viewpoint and/or the light source can be positioned outside the boundary of the volume represented by the imaging data. For example, the determined path 54 or 74 may pass outside the volume represented by the imaging data.

In some such embodiments, the acquisition and processing circuitry 34 extends values of the SDF for positions outside the volume represented by the volumetric image data and use the extended values in determining the viewpoint positions and/or light positions. The values of the SDF may be obtained for positions outside the volume by at least one of resampling the SDF or using SDF values at or near a boundary of the volume to extend the SDF. For example, an extrapolation procedure may be used to extrapolate from SDF values at or near the boundary in order to obtain values for the SDF for positions outside the boundary.

Although embodiments have been described in which position, view direction and orientations have been set based on distance to a nearest surface, any other suitable constraints or requirements can be applied to determine position, view direction and/or orientation, for example based on distance or other spatial relationship to a selected anatomical feature or region rather than to a nearest surface.

According to embodiments there is provided an SDF based camera model that keeps the view within a certain distance of the material in the scene. The camera model may also determine a look-at direction of the camera.

According to embodiments, there is provided a method to provide an a view of a 3D object from a consistent distance using a signed distance field to the visible material in which the camera model traverses the gradient lines of the SDF field where the distance remains constant. A zoom or forward movement may be defined to be in the gradient direction of the SDF field where the distance decreases. A minimum forward distance may be defined to avoid getting near or into material. A resampled SDF field may be used to provide additional coverage outside the volume bounds. Coverage of the SDF field may be extended outside the volume bounds by interactively computing the SDF value outside the bounds based on the outer faces of the SDF field. The look-at direction may be independent of the movement directions. The look-at direction may be determined based on the movement directions. The look-at direction may be: along the gradient of the SDF at the camera location (looking towards the nearest surface); or looking at a point traversed from the camera in multiple steps towards a local minima of the SDF; or looking at a global minima (fixed) point of the SDF. Movement (e.g. for each axis) may be limited to a single plane by evaluating the 2D gradient/tangent of the SDF field projected onto the plane.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments are described, these embodiments have been presented by way of example only and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image processing apparatus, comprising:
processing circuitry configured to
    acquire volumetric image data for rendering, wherein the volumetric image data represents a volume;
    receive or determine a desired direction of movement of a viewpoint or light;
    determine a plurality of viewpoint positions or light positions along the desired direction of movement based on distance between (1) the viewpoint or the light, respectively, and (2) a surface in the image data to provide a specified distance between (1) the viewpoint or the light, and (2) a nearest point on the surface to the viewpoint or the light, wherein the nearest point changes as the viewpoint or light moves in the desired direction, wherein the specified distance is a constant distance or other desired distance, and wherein the plurality of viewpoint positions or light positions are determined using a distance field, a mesh, a look-up table, or a database that represents distance to the surface for positions in the volume, wherein the processing circuitry is further configured to determine the plurality of viewpoint positions or light positions based on constant gradient lines of a signed distance field (SDF); and render the volumetric image data based on the plurality of viewpoint positions or the light positions.

2. The medical image processing apparatus according to claim 1, wherein the processing circuitry is further configured to, in rendering the volumetric data, generate a respective image for each of the determined plurality of viewpoint positions or light positions.

3. The medical image processing apparatus according to claim 2, wherein the processing circuitry is further configured to, in generating the images, display the generated images, or store or transmit image data representing the generated images.

4. The medical image processing apparatus according to claim 1, wherein the processing circuitry is further configured to generate the SDF based on the volumetric image data.

5. The medical image processing apparatus according to claim 1, wherein for each of the plurality of viewpoint positions or light positions, the processing circuitry is further configured to determine a light orientation of the light and/or a view direction of the viewpoint.

6. The medical image processing apparatus according to claim 5, wherein the image rendering is based on the view direction of the viewpoint or on the light orientation of the light, and at least one of:
the view direction or the light orientation is independent of the direction of movement of the viewpoint or the light;
the view direction or the light orientation is determined based on the direction of movement of the viewpoint or the light;
the view direction or the light orientation is along a gradient of the SDF;
the view direction or the light orientation is towards a nearest surface;
the view direction or the light orientation is towards a selected point; and
the view direction or the light orientation is towards a global minima point or a local minima point of the SDF.

7. The medical image processing apparatus according to claim 5, wherein the view direction of the viewpoint or the light orientation of the light is determined to face towards a first point and subsequently towards a second point, and the processing circuitry is further configured to control a rate of change of the view direction or the light orientation.

8. The medical image processing apparatus according to claim 1, wherein the processing circuitry is further configured to, in determining the plurality of viewpoint positions or light positions, determine a series of the viewpoint positions or the light positions, wherein the series of the viewpoint positions or the light positions are determined to maintain a desired minimum distance from the surface.

9. The medical image processing apparatus according to claim 1, wherein the processing circuitry is further configured to, in determining the plurality of viewpoint positions or light positions, determine a series of the viewpoint positions or the light positions separated by a step size, and select the step size automatically or based on user input.

10. The medical image processing apparatus according to claim 1, wherein the processing circuitry is further configured to vary a speed of movement of the viewpoint or the light in dependence on the distance to the surface.

11. The medical image processing apparatus according to claim 1, wherein the processing circuitry is further configured to vary a speed of movement of the viewpoint or the light to maintain a desired angular velocity of the viewpoint or the light.

12. The medical image processing apparatus according to claim 1, wherein for at least one rendering procedure the processing circuitry is further configured to constrain the viewpoint or the light to be on a selected two-dimensional plane.

13. The medical image processing apparatus according to claim 12, wherein the processing circuitry is further configured to determine the plurality of viewpoint positions or light positions on the selected two-dimensional plane based on a projection onto the plane of the constant gradient lines of the SDF.

14. The medical image processing apparatus according to claim 1, wherein the processing circuitry is further configured to, in determining the plurality of viewpoint positions or light positions, determine at least some of the plurality of viewpoint positions or light positions to be outside the volume represented by the volumetric image data.

15. The medical image processing apparatus according to claim 14, wherein the processing circuitry is further configured extend values of the SDF for positions outside the volume represented by the volumetric image data, and use the extended values in determining the plurality of viewpoint positions or light positions.

16. The medical image processing apparatus according to claim 15, wherein the processing circuitry is further configured to extend the values of the SDF by at least one of resampling the SDF or using SDF values at or near a boundary of the volume to extend the SDF.

17. The medical image processing apparatus according to claim 1, wherein the plurality of viewpoint positions are successive positions of a virtual camera.

18. The medical image processing apparatus according to claim 1, wherein the specified distance is the constant distance.

19. A method, comprising:
receiving volumetric image data for rendering, wherein the volumetric image data represents a volume;
receiving or determining a desired direction of movement of a viewpoint or light;
determining a plurality of viewpoint positions or light positions along the desired direction of movement based on distance between (1) the viewpoint or the light, respectively, and (2) a surface in the image data to provide a specified distance between (1) the viewpoint or the light, and (2) a nearest point on the surface to the viewpoint or the light, wherein the nearest point changes as the viewpoint or light moves in the desired direction, wherein the specified distance is a constant distance or other desired distance, and wherein the plurality of viewpoint positions or light positions are determined using a distance field, a mesh, a look-up table, or a database that represents distance to the surface for positions in the volume, wherein the determining step further includes determining the plurality of viewpoint positions or light positions based on constant gradient lines of a signed distance field (SDF); and rendering the volumetric image data based on the plurality of viewpoint positions or the light positions.

* * * * *